Nov. 3, 1925.
W. A. WADLEIGH
1,560,125
WHEEL CENTER FOR FORD TRACTORS
Filed Jan. 31, 1925
2 Sheets-Sheet 1
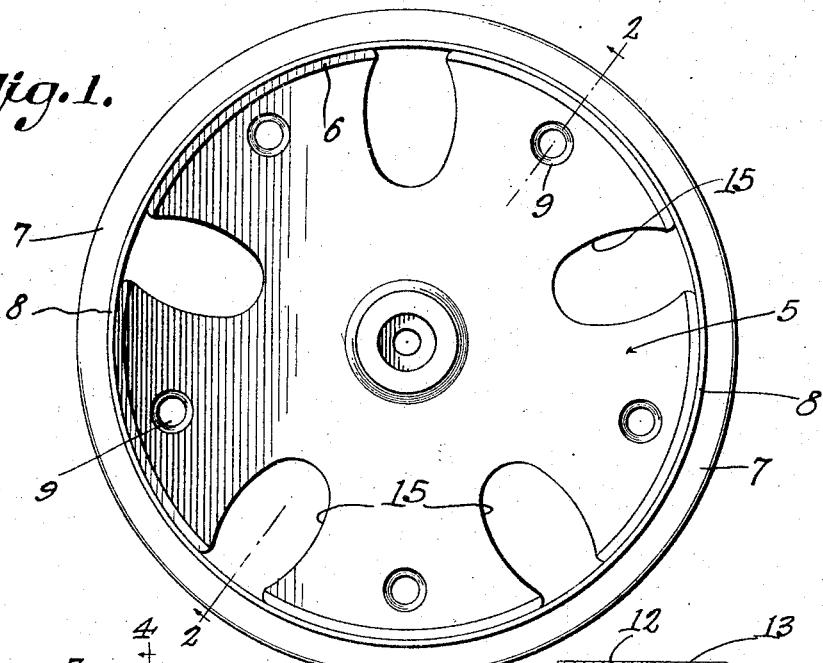
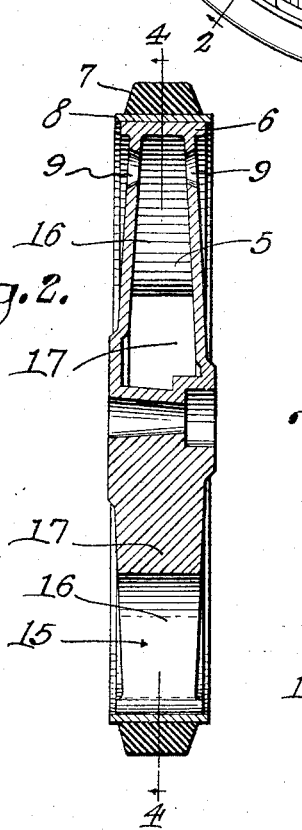
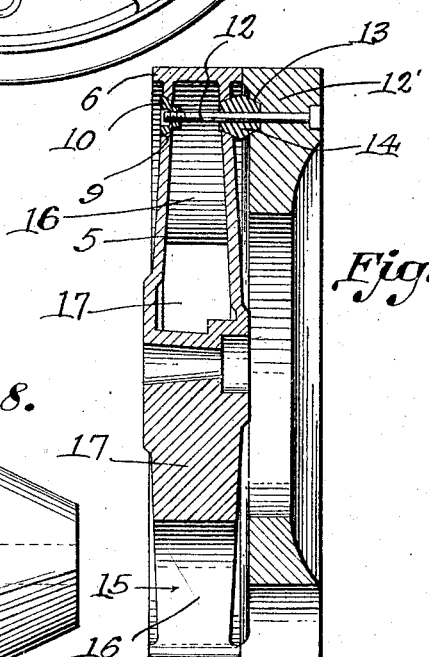
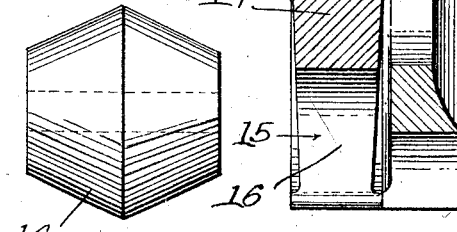
Inventor
William A. Wadleigh
By C. A. Snow & Co.
Attorneys.

Nov. 3, 1925.

W. A. WADLEIGH 1,560,125

WHEEL CENTER FOR FORD TRACTORS

Filed Jan. 31, 1925      2 Sheets-Sheet 2

Inventor
William A. Wadleigh
By C. A. Snowbles
Attorney

Patented Nov. 3, 1925.

1,560,125

UNITED STATES PATENT OFFICE.

WILLIAM A. WADLEIGH, OF SEATTLE, WASHINGTON.

WHEEL CENTER FOR FORD TRACTORS.

Application filed January 31, 1925. Serial No. 6,123.

*To all whom it may concern:*

Be it known that I, WILLIAM A. WADLEIGH, a citizen of the United States, residing at Seattle, in the county of King and State of Washington, have invented a new and useful Wheel Center for Ford Tractors, of which the following is a specification.

This invention relates to motor vehicle wheel construction and aims to provide a wheel which will be exceptionally light in weight so that the cost of shipping the wheel will be reduced to the minimum.

Another important object of the invention is to provide a wheel of this character, which when weighted with loose material such as sand or the like, will be evenly balanced to insure the efficient operation thereof.

A still further object of the invention is to provide a wheel whereby the tread may be widened to increase the traction qualities thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a wheel constructed in accordance with the invention.

Figure 2 is a sectional view taken on line 2—2 of Figure 1.

Figure 3 is a sectional view through a wheel constructed in accordance with the invention and showing the auxiliary wheel ring as applied thereto.

Figure 8 is a side elevational view of one of the filler plugs.

Figure 4:
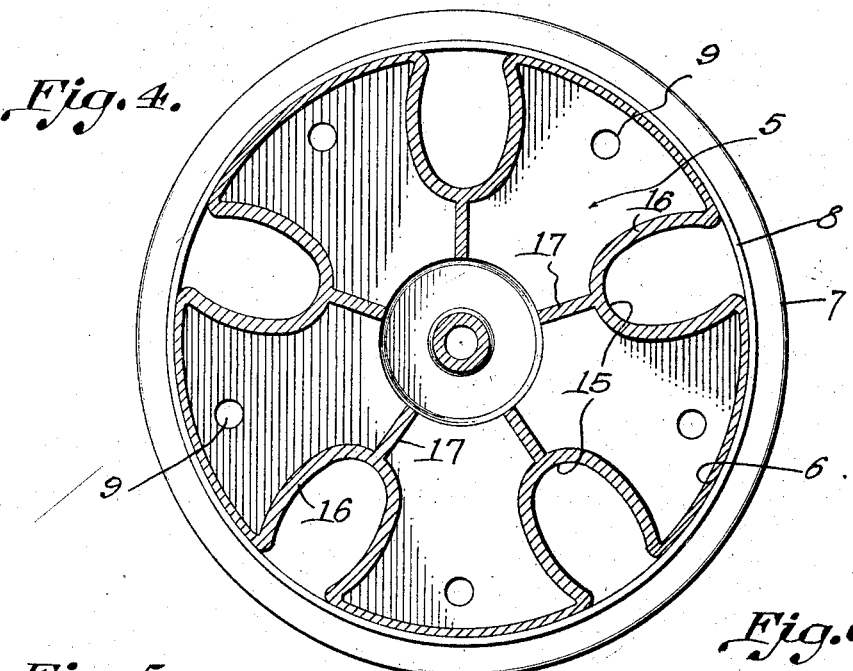
Figure 4 is a longitudinal sectional view through a wheel constructed in accordance with the invention.
Figure 5:
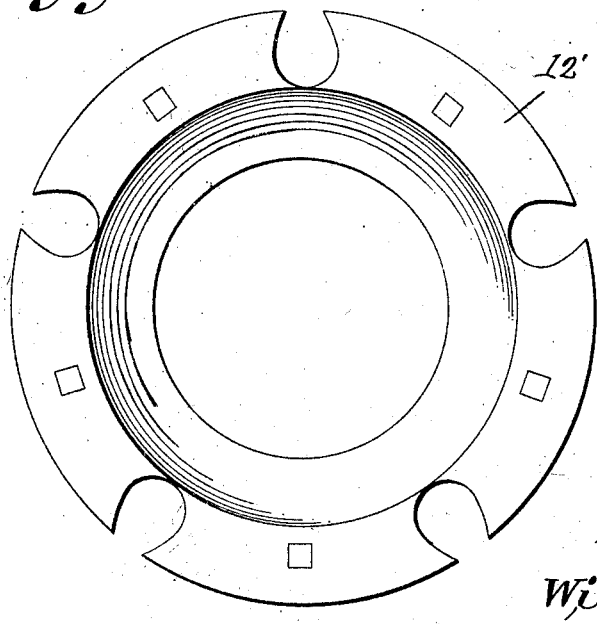
Figure 5 is a side elevational view of a wheel ring.
Figure 6:
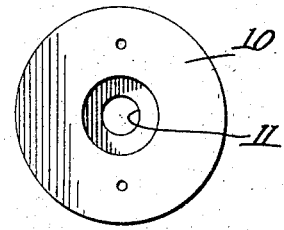
Figure 6 is a front elevational view of one of the tapered plugs.
Figure 7:
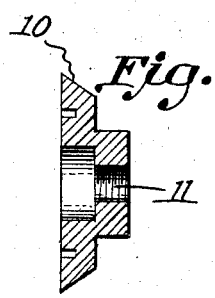
Figure 7 is a sectional view through one of the plugs.

Referring to the drawings in detail, the body portion of the wheel is indicated at 5 and is shown as hollow so that a suitable weighting material may be positioned therein to add sufficient weight to the wheel, adapting the device for heavy duty purposes.

The wheel is cast with a rim which is formed with suitable cut out portions, the cut out portions being closed by the auxiliary rim 8 on which the tire is moulded. Openings 9 are provided in the side walls of the wheel construction and as shown the walls of these openings are tapered to accommodate the tapered plugs 10 formed with threaded openings 11 to accommodate the threaded ends of the bolts 12, when the auxiliary wheel rim, to be hereinafter more fully described, is secured to the wheel. These plugs normally close the openings to prevent material from passing into the wheel, or prevent the material which is contained in the wheel for loading purposes, passing therefrom.

The wheel ring is indicated by the reference character 12', and is provided with tapered recessed portions 13 that accommodate the spacing members 14 which are shown as formed with tapered extremities conforming to the tapers of the walls of the openings mentioned. Thus it will be seen that when these spacing members 14 are positioned between a wheel and its ring member, the ring member and wheel will be held rigidly against movement and at the same time held in proper spaced relation with each other.

Openings are formed through the spacing members to accommodate the bolts 12 when the wheel ring member 12' has been positioned.

The body portion of the wheel is also formed with openings 15 which are relatively large and extend to points adjacent to the ring members 6 so that chains, ropes or similar anti-skid members may be secured to the body portion of the wheel to overlie the tire supported thereon.

Curved partitioning walls 16 are provided adjacent to the openings 15, which walls also include relatively straight walls 17 that extend to the hub or central portion of the wheel, so that material placed within the wheel through the filling openings will be supported against movement within the compartments formed by the partitioning member, to the end that the wheel will be evenly balanced at all times and the loose material contained within the wheel will be held against movement.

It is to be understood that the wheel ring member 12' is also supplied with a tire not shown, and will greatly increase the width of the wheel to adapt the wheel for use when great traction is desired.

From the foregoing it is believed that the construction of the device will be clear and that a further detail description of the device is unnecessary.

I claim:—

In a wheel construction, a hollow body portion, having tapered openings in its side walls, a rim and tire supported on the body portion, a ring member having tapered openings, the openings of the ring member adapted to aline with the openings of the body portion, tapered plugs fitted in tapered openings of the body portion, said tapered plugs having threaded openings, spacing members having tapered extremities fitted in tapered openings in the body portion and adjacent tapered openings of the ring member, and bolts extending through the openings and spacing members and having threaded ends fitted in the threaded openings of the plugs.

In testimony that I claim the foregoing as my own, I have hereto affixed my signature.

WM. A. WADLEIGH.